United States Patent
Ding et al.

(10) Patent No.: US 10,685,164 B1
(45) Date of Patent: Jun. 16, 2020

(54) CIRCUIT DESIGN ROUTING BASED ON PARALLEL RUN LENGTH RULES

(71) Applicant: Cadence Design Systems, Inc., San Jose, CA (US)

(72) Inventors: Yi-Xiao Ding, Austin, TX (US); Wing-Kai Chow, Austin, TX (US); Gracieli Posser, Austin, TX (US); Mehmet Can Yildiz, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/239,310

(22) Filed: Jan. 3, 2019

(51) Int. Cl.
*G06F 17/50* (2006.01)
*G06F 30/394* (2020.01)
*G06F 111/04* (2020.01)
*G06F 111/20* (2020.01)

(52) U.S. Cl.
CPC ........ *G06F 30/394* (2020.01); *G06F 2111/04* (2020.01); *G06F 2111/20* (2020.01)

(58) Field of Classification Search
CPC ............. G06F 17/5077; G06F 2217/02; G06F 2217/06
USPC ........................................................ 716/129
See application file for complete search history.

(56) References Cited

U.S. PATENT DOCUMENTS

| | | | | |
|---|---|---|---|---|
| 8,595,662 | B1 * | 11/2013 | Yu ........................ | G06F 17/5068 716/110 |
| 8,863,048 | B1 * | 10/2014 | Gerousis ............. | G06F 17/5072 716/100 |
| 9,117,052 | B1 * | 8/2015 | Salowe ............... | G06F 17/5072 |
| 9,213,793 | B1 * | 12/2015 | Salowe ............... | G06F 17/5077 |
| 9,286,432 | B1 * | 3/2016 | Gerousis ............. | G06F 17/5077 |
| 9,372,952 | B1 * | 6/2016 | Sun ...................... | G06F 17/5077 |
| 2011/0239178 | A1 * | 9/2011 | Yamashita .......... | G06F 17/5077 716/122 |

* cited by examiner

*Primary Examiner* — Jack Chiang
*Assistant Examiner* — Brandon Bowers
(74) *Attorney, Agent, or Firm* — Schwegman Lundberg & Woessner, P.A.

(57) ABSTRACT

Various embodiments provide for circuit design routing based on parallel run length (PRL) rules. In particular, a plurality of PRL rules is accessed and used to generate a set of additional routing blockages around an existing routing blockage of the circuit design. The additional routing blockages can be positioned relative to the existing routing blockage. During routing, the set of additional routing blockages can be modeled into a capacity map, which is then used by global to generate routing guide(s) between at least two nodes of the circuit design. In doing so, the various embodiments can assist in routing a wire while avoiding violation of the plurality of PRL rules with respect to the existing blockage, can speed up performance of global routing, can make it easier for detailed routing to honor routing guides produced by global routing, and can speed up performance of detailed routing in resolving DRC violations.

20 Claims, 7 Drawing Sheets

CIRCUIT DESIGN ROUTING BASED ON PARALLEL RUN LENGTH RULES

TECHNICAL FIELD

Embodiments described herein relate to circuit design and, more particularly, to systems, methods, devices, and instructions for routing a net of a circuit design based on a parallel length run (PRL) rule, which may be part of electronic design automation (EDA).

BACKGROUND

Electronic design automation (EDA) software systems commonly perform routing of networks of circuit designs, such as clock networks (hereafter, clock nets). Usually, net routing can be performed in two phases, where the first phase involves routing guides that attempt to generate timing-aware/timing-based global routing of nets, and the second phase involves detailed routing of nets with specific wires metal traces) based on the routing guides, while attempting to resolve/avoid one or more design rule violations.

BRIEF DESCRIPTION OF THE DRAWINGS

Various ones of the appended drawings merely illustrate example embodiments of the present disclosure and should not be considered as limiting its scope.

DETAILED DESCRIPTION

Various embodiments provide for circuit design routing based on parallel run length (PRL) rules. More particularly, some embodiments route a net of a circuit design (e.g., clock net) based on modeling one or more PRL rules as routing blockages (also referred to as "blockages") that are considered when routing a net of a circuit design.

According to some embodiments, during early phases of performing routing on a circuit design (e.g., prior to global routing phase), a plurality of parallel run length (PRL) rules is accessed (e.g., read) and used to generate a set of additional routing blockages around an existing routing blockage of the circuit design (e.g., a big blockage of the circuit design, such as one caused by a circuit design macro block). The plurality of PRL rules can be read from a table of PRL rules, which may provide spacing requirements based on a parallel run length of two adjacent circuit components and a maximum width of the two adjacent circuit components. For some embodiments, the plurality of PRL rules read from the table comprises the entirety of the table. The additional routing blockages can be positioned relative to (e.g., along the boundary of) the existing routing blockage. The additional routing blockages can be smaller than the existing routing blockage and, as such, the additional routing blockages may be referred to as "bumps" or "spacing bumps." For some embodiments, during routing, the set of additional routing blockages (bumps) is modeled into a capacity map (e.g., prior to global routing), which is then used by global routing to generate a set of routing guides between at least two nodes of the circuit design (e.g., between two pins or between a source and a pin). In particular, the global routing can be performed on the circuit design based on the capacity map, and the global routing can output a set of routing guides that are used by detailed routing to route a wire between two nodes of the circuit design. In doing so, the various embodiments can assist in routing a wire while avoiding violation of the plurality of PRL rules with respect to the existing blockage, can speed up performance of global routing, can make it easier for detailed routing to honor routing guides produced by global routing, and can speed up performance of detailed routing in resolving DRC violations.

Compared to traditional circuit design routing, an embodiment described herein can increase the amount of routing resources (routing area) available for use during early routing phases (e.g., global routing) by making such early routing phases aware of PRL rules to be enforced/maintained in later routing phases (e.g., detailed routing). By generating additional routing blockages (bumps) based on the PRL rules (e.g., PRL rule table) and modeling those additional routing blockages into a capacity map used by global routing to generate routing guides, various embodiments can obviate the need for global routing to check the PRL rules during runtime, thereby speeding up performance of global routing. Further, compared to traditional circuit design routing, an embodiment described herein can reduce the runtime overhead of circuit design routing by avoiding PRL violations in earlier routing phases (e.g., global routing) rather than in later routing phases (e.g., detailed routing) when routing operations have more runtime overhead. This can be particularly useful for routing a clock net of a circuit design, where reducing runtime overhead is important. By considering a plurality of PRL rules during global routing (to generate a capacity map accordingly), an embodiment described herein can enable detailed routing to achieve better Quality of Result (QoR) and Turn-around-time (TAT) than conventional circuit design routing. Accordingly, various embodiments described herein improve a computer system's ability to perform routing within a circuit design.

Depending on the embodiment, the methodologies described herein can be performed in whole or in part during global routing performed on a circuit design.

As used herein, a PRL rule comprises a spacing requirement between two adjacent circuit design components, such as wire segments (e.g., interconnect wire segments), based on parallel run length of the two adjacent components and width of the two adjacent components (e.g., wires). For instance, upon determining a largest width of two adjacent components (e.g., wires) that are running parallel, a PRL rule associated with that largest width can be used to determine the space requirement between those two components based on their parallel run length. The PRL rule can be identified from a table of PRL rules that list space requirements based on max width and parallel run length values. Generally, the larger the width or the more parallel run length, the more space is required by the PRL rules. A PRL rule can be part of a set of design rule constraints (DRCs) that can be enforced against a circuit design during its generation, such as during detailed routing operation. As used herein, a routing blockage can comprise a defined area of a circuit design that serves as an obstruction with respect to routing (e.g., routing a wire associated with a network of the circuit design, such as a clock net) through the defined area. For example, a routing blockage can be caused by a pre-routed power wire, ground wire, or via, or by a macro block included by a circuit design, which may be associated with a circuit design intellectual property (IP) block. A given routing blockage can comprise an area covering one or more layers of a circuit design (e.g., layers M1, M2, and M3). For various embodiments, circuit design routing routes a wire around a routing blockage, and a PRL can define the spacing requirement between the routing blockage and routed wire.

As used herein, global routing can comprise determining one or more routing guides (also referred to as "guides") for routing a physical wire (e.g., interconnect line or wire) within a circuit design between at least two nodes of circuit design (e.g., two pins or a source and a pin). A routing guide can serve as a "loose" routing path or routing area within which detailing routing can route a physical write between two nodes (e.g., pins) of a circuit design, A routing guide for a clock network of a circuit design can be referred to as a "clock routing guide." According to various embodiments, global routing considers/accounts for one or more routing blockages (blockages) of the circuit design when determining one or more guides between nodes of the circuit design. The output of performing global routing on a circuit design can comprise a capacity map for the circuit design that describes or defines one or more routing resources for routing wires between nodes of the circuit design. A capacity map can comprise a grid describing the routing capacity of a routing area. Accordingly, a capacity map can quantify a capacity of a given routing guide/path/area of a circuit design (as determined by global routing) to have a physical wire routed through the given routing guide/path/area. A capacity map can be used during global routing to determine where it routes a network of a circuit design (using a set of routing guides), while avoiding routing a network through grid not having sufficient capacity. A capacity map can quantify a capacity of a given routing guide/path/area of a circuit design (as determined by global routing) to have a physical wire routed through the given routing guide/path/area.

As used herein, detailed routing can comprise routing a physical wire (e.g., interconnect wire) within a circuit design, between at least two nodes of the circuit design, based on one or more guides determined by global routing for the circuit design. The one or more guides provided by global routing can provide detailed routing process with a topology for routing wires, which in turn can enable detailed routing to route wires without violating one or more design rule constraints (DRCs) associated with a circuit design. This can be referred to as detailed routing being performed with clean DRCs. Accordingly, for some embodiments, global routing is performed, global routing is performed on a circuit design prior to detailed routing being performed on the circuit design. Generally, global routing can be performed on a circuit design faster than performing detailing routing on the same circuit design. The routed wires of a circuit design can form a network (also referred to as a "net") of the circuit design.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
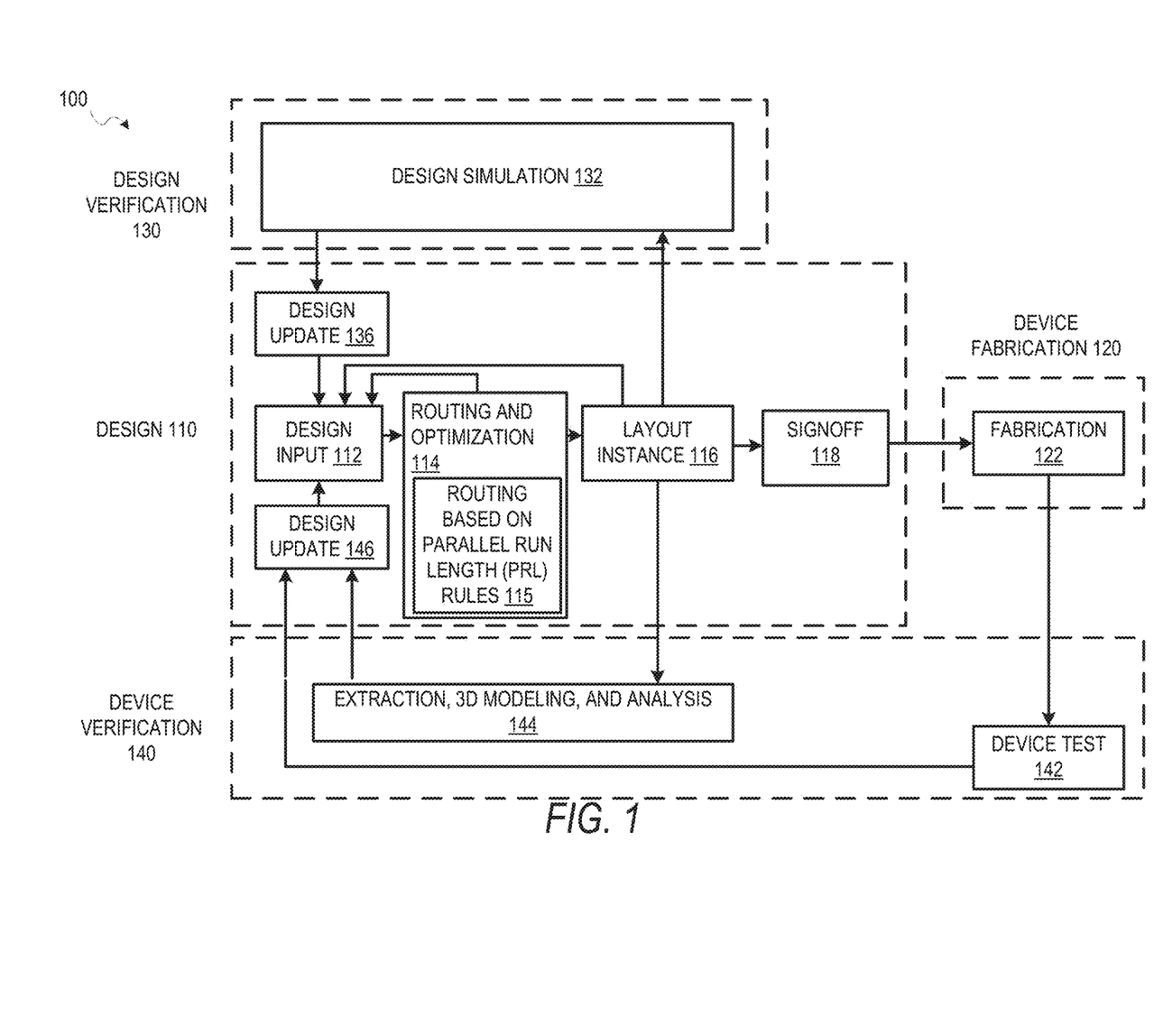
FIG. 1 is a diagram illustrating an example design process flow for circuit design routing based on parallel run length rules, according to some embodiments.

FIG. 1 is a diagram illustrating an example design process flow 100 for circuit design routing based on parallel run length rules, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. As shown, the routing and optimization 114 operation includes routing based on parallel run length (PRL) rules 115 operation, which may be performed in accordance with various embodiments described herein. For some embodiments, routing during the routing and optimization 114 operation comprises a global routing (e.g., global routing phase) and a detailed routing (e.g., detailed routing phase), and the routing based on PRL rules 115 operation is performed prior to or as an initial part of the global routing phase. The routing based on PRL rules 115 can generate an output (e.g., capacity map) that is used by the global routing phase to generate one or more routing guides/path/areas. Subsequently, the detailed routing phase can be performed based on the one or more routing guides/path/areas generated by the global routing phase.

While the design process flow 100 shows optimization occurring prior to a layout instance 116, routing (e.g., the routing based on PRL rules 115 operation), timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
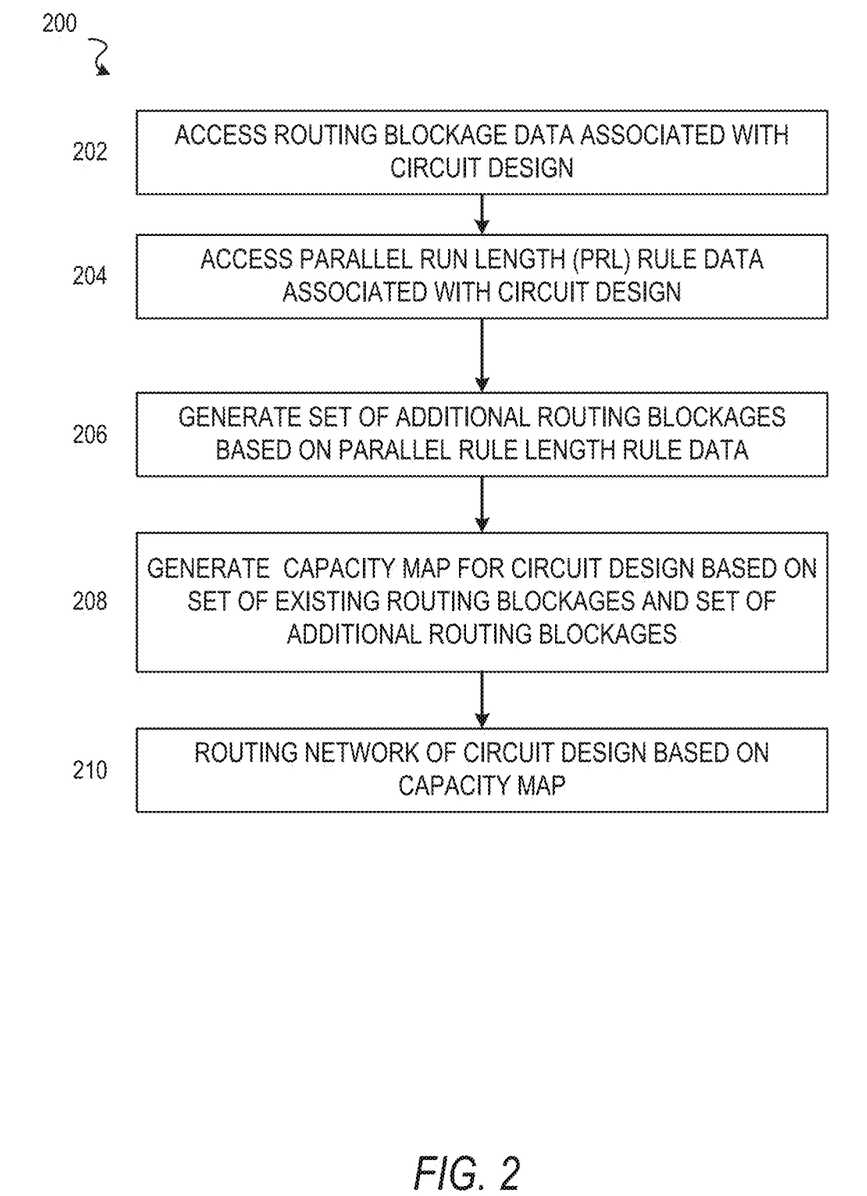
FIGS. 2 and 3 are flowcharts illustrating example methods for design routing based on a plurality of parallel run length (PRI) rules, according to some embodiments.
Figure 3:
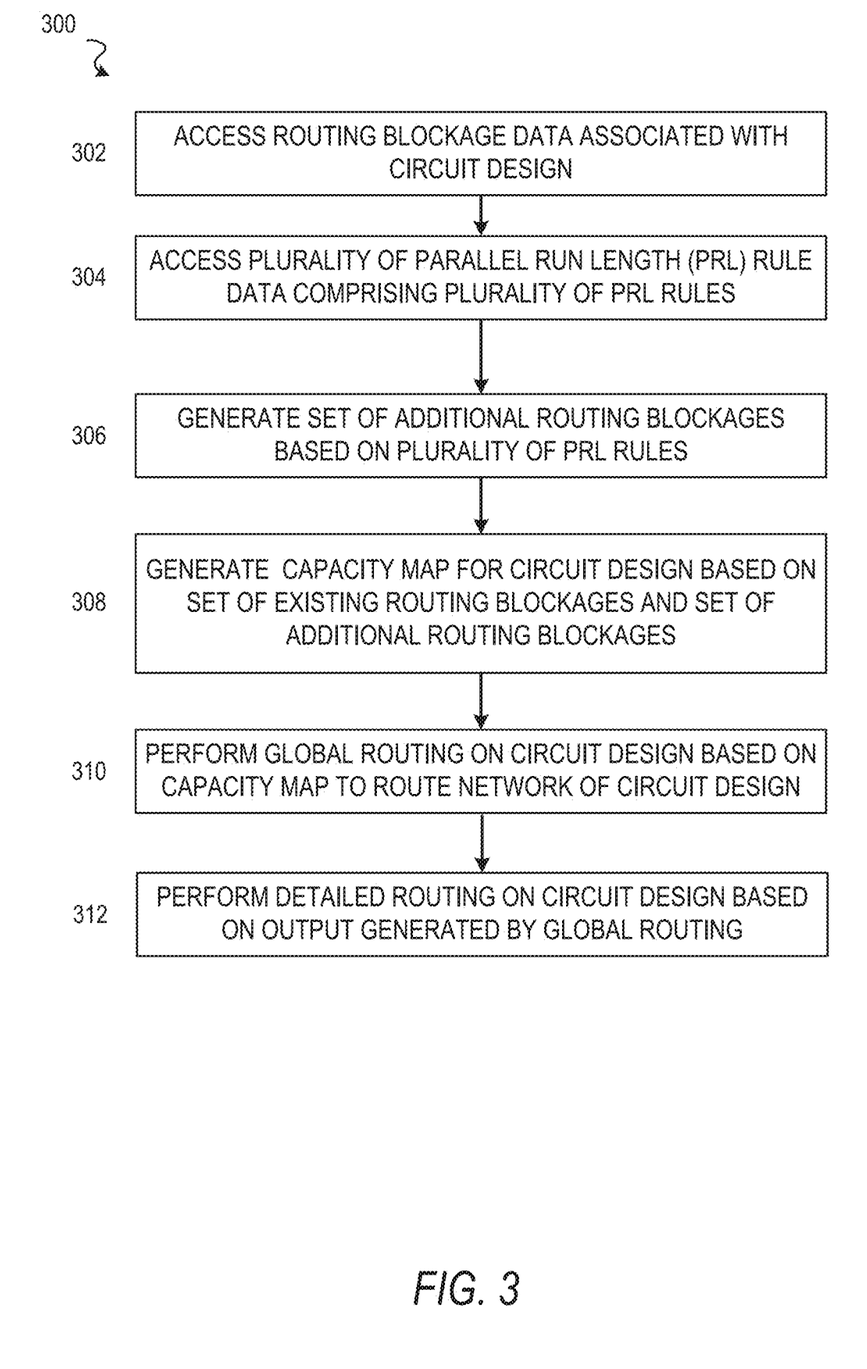

FIGS. 2 and 3 are flowcharts illustrating example methods for circuit design routing based on a plurality of parallel run length (PRL) rules, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 2, the flowchart illustrates the example method 200 for circuit design routing based on a plurality of PRL rules, according to some embodiments. For some embodiments, the method 200 is performed as part of a routing process applied to a circuit design (e.g., by an EDA software system). An operation of the method 200 (or another method described herein) may be performed by a hardware processor (e.g., central processing unit or graphics processing unit) of a computing device (e.g., desktop, server, etc.).

The method 200 as illustrated begins with operation 202 accessing routing blockage data associated with a circuit design. According to some embodiments, the routing blockage data describes a set of existing routing blockages within the circuit design (e.g., ones caused by macro blocks included by the circuit design). The routing blockage data can be stored as part of a circuit design (e.g., IC circuit design) stored in memory (e.g., input design file for the circuit design).

The method 200 continues with operation 204 accessing a plurality of parallel run length (PRL) rules from PRL rule data associated with the circuit design. The PRL rule data can be specifically or generically associated with the circuit design. According to some embodiments, the PRL rule data comprises a table of more than two PRL rules. Additionally, for some embodiments, the plurality of PRL rules read from the table comprises the entirety of the table. As noted herein, the table can provide spacing requirements based on a parallel run length of two adjacent circuit components and a maximum width of the two adjacent circuit components.

The method 200 continues with operation 206 generating a set of additional routing blockages (bumps) based on the plurality of PRL rules accessed at operation 204. For some embodiments, the set of additional routing blockages is associated with (e.g., relative to) a particular routing blockage in the set of existing routing blockages. In particular, the set of additional routing blockages are positioned relative to adjacent to) a boundary of the particular routing blockage. The generation of the set of additional routing blockages (with respect to the particular routing blockage) can represent the modeling of the plurality of PRL rules (from the PRL rule data) into the set of additional routing blockages.

The method 200 continues with operation 208 generating a capacity map for the circuit design based on the set of existing routing blockages (from the routing blockage data accessed at operation 202) and the set of additional routing blockages (generated at operation 206). For some embodiments, the capacity map is generated based on the set of existing routing blockages and the set of additional routing blockages. Additionally, for some embodiments, the capacity map is generated prior to performing global routing on the circuit design. As noted herein, the global routing can generate one or more routing guides/paths/areas based on the capacity map, thereby causing global routing to consider the set of existing routing blockages and the set of additional routing blockages when generating the one or more routing guides/paths/areas. The generation of a capacity map can represent the modeling of the plurality of PRL rules into the capacity map. The capacity map can be used by global routing in generating a set of routing guides for connecting two or more nodes of a circuit design, and the set of routing guides can be subsequently used by detailed routing for connecting the two or more nodes using specific The method 200 continues with operation 210 routing a network of the circuit design based on the capacity map. For some embodiments, routing a network of the circuit design based on the capacity map comprises performing global routing on the circuit design based on the capacity map. Subsequently, for some embodiments, detail routing is performed on the circuit design based on the output of global routing (e.g., routing guides generated by global routing). As noted herein, the detailed routing can route a wire based on one or more routing guides/paths/areas.

Referring now to FIG. 3, the flowchart illustrates an example method 300 for circuit design routing based on a plurality of PRL rules, according to some embodiments. Like the method 200 of FIG. 2, the method 300 may be performed as part of a routing process applied to a circuit design. An operation of the method 300 may be performed by a hardware processor.

The method 300 as illustrated begins with operations 302 through 308, which according to some embodiments, are respectively similar to operations 202 and 208 of the method 200 described above with respect to FIG. 2.

The method 300 continues with operation 308 generating a capacity map for the circuit design based on the set of existing routing blockages (from the routing blockage data accessed at operation 302) and the additional routing blockage (generated at operation 306).

The method 300 continues with operation 310 performing global routing on the circuit design based on the capacity map (generated at operation 308) to route a network of the circuit design.

The method 300 continues with operation 312 performing detailed routing on the circuit design based on output (e.g., one or more routing guides) generated by global routing (generated at operation 310).

Figure 4:
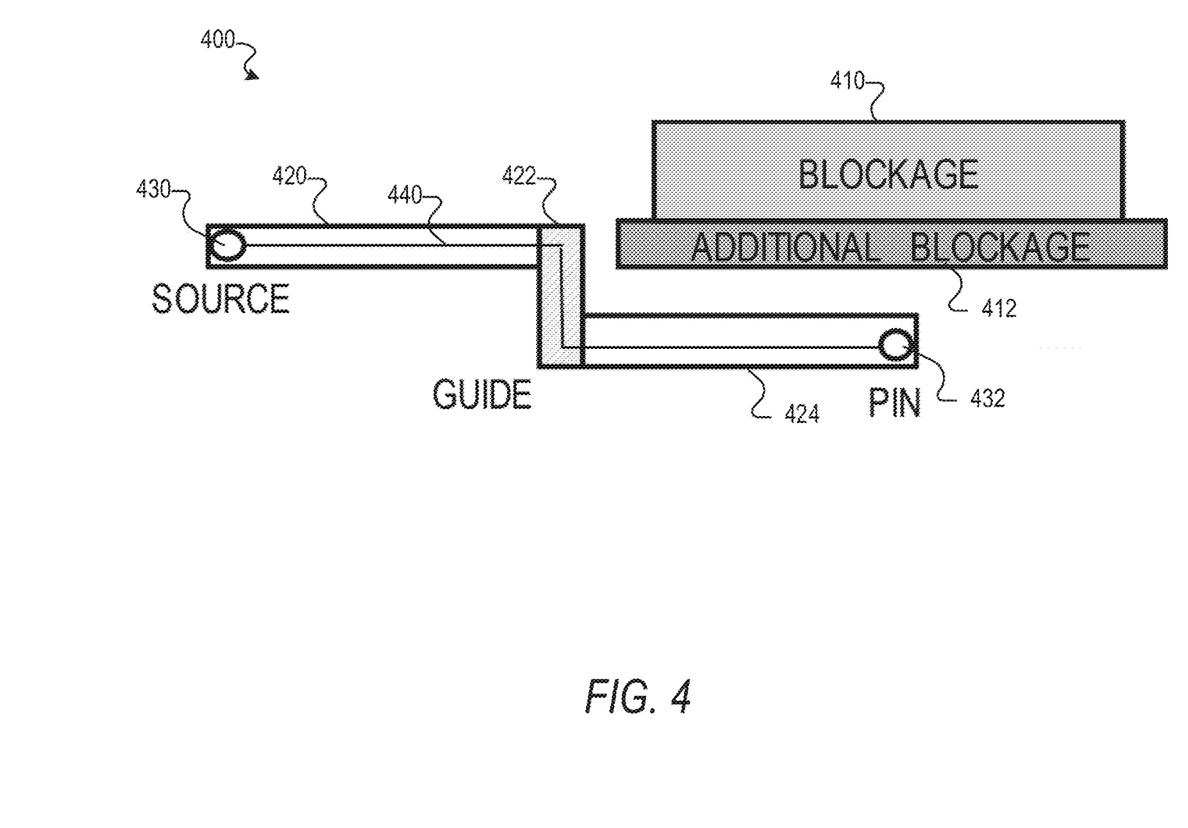
FIG. 4 is a circuit diagram illustrating example routing in view of an additional routing blockage based on a plurality of PRL rules, according to some embodiments.

FIG. 4 is a circuit diagram 400 illustrating example routing in view of an additional routing blockage (bump) 412, according to some embodiments. The additional blockage 412 can be one produced by the method 200 of FIG. 2 or the method 300 of FIG. 3. As noted herein, some embodiments model a plurality of PRL rules into the additional blockage 412 (e.g., via a capacity map). As shown, the additional blockage 412 is positioned adjacent to an existing routing blockage 410 of the circuit design. Based on the existing routing blockage 410 and the additional blockage 412 (e.g., via the capacity map), global routing can generate routing guides/paths/areas 420, 422, 42.4 from a source 430 to a pin 432. Subsequently, based on the routing guides 420, 422, 424, detailed routing can route a wire 440 from the source 430 to the pin 432.

Figure 5:
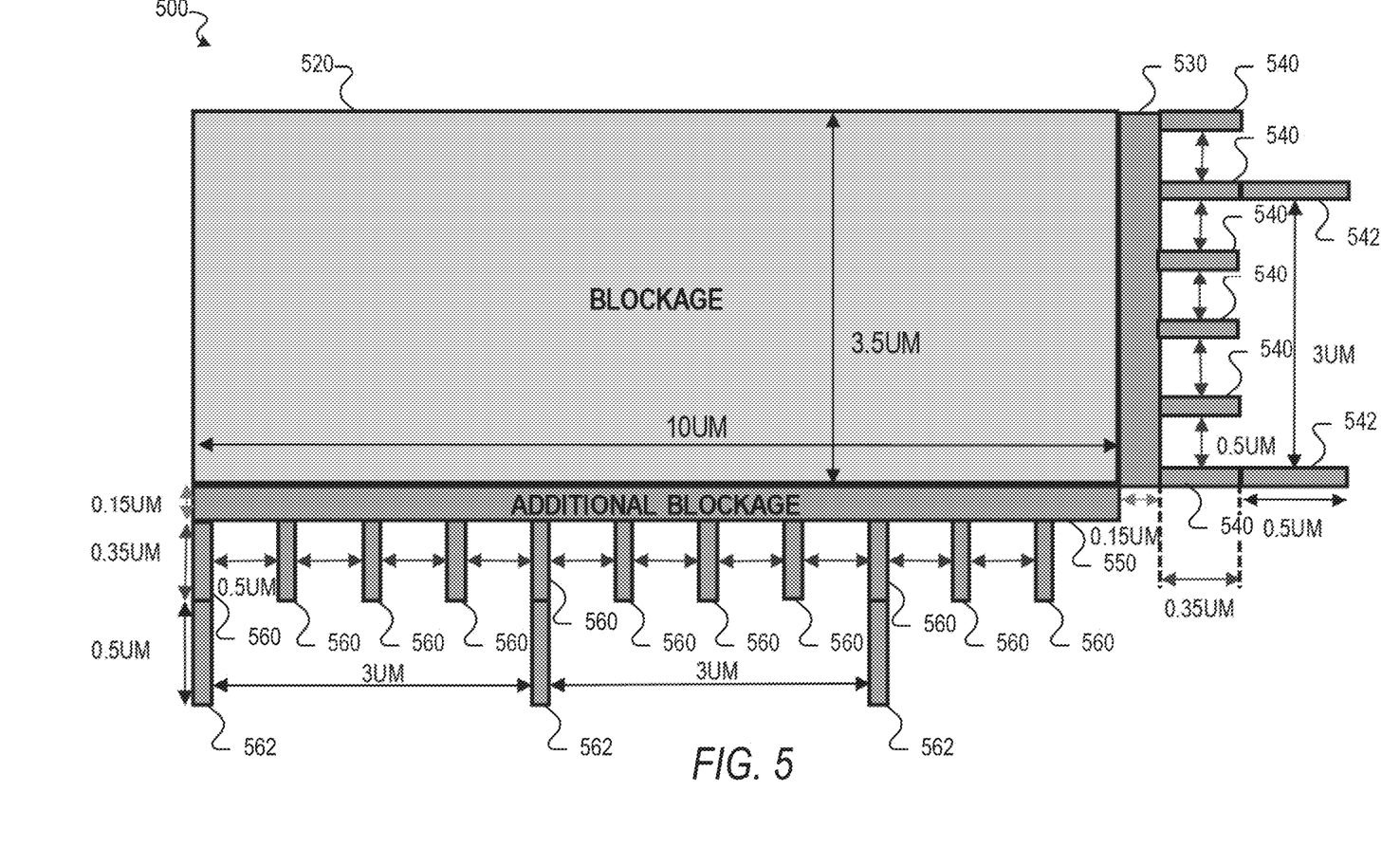
FIG. 5 is a circuit diagram illustrating example additional routing blockages based on a plurality of PRL rules, according to some embodiments.

FIG. 5 is a circuit diagram 500 illustrating example additional routing blockages (bumps) 530 through 562 based on a plurality of PRL rules, according to some embodiments. One or more of the additional blockages 530 through 562 can be ones produced by the method 200 of FIG. 2 or the method 300 of FIG. 3. As noted herein, some embodiments model a plurality of PRL rules into the additional blockages 530 through 562 (e.g., via a capacity map). As shown, the additional blockages 530 through 562 are positioned relative to an existing routing blockage 520, which as illustrated (for example purposes) has a height of 3.5 micrometers and a width of 10 micrometers. In particular, the additional routing blockages 530 and 550 model a rule that indicates a space requirement of 0.15 micrometers from the boundaries of the existing routing blockage 520. The additional routing blockages 540 and 560 model PRL rules that permit routing within the 0.5 micrometers of space between each of the additional routing blockages 540, and permit routing within the 0.5 micrometers of space between each of the additional routing blockages 560. Likewise, the additional routing blockages 542 and 562 model PRL rules that permit routing within the 3.0 micrometers of space between each of the additional routing blockages 542, and permit routing within the 3.0 micrometers of space between each of the additional routing blockages 562.

Figure 6:
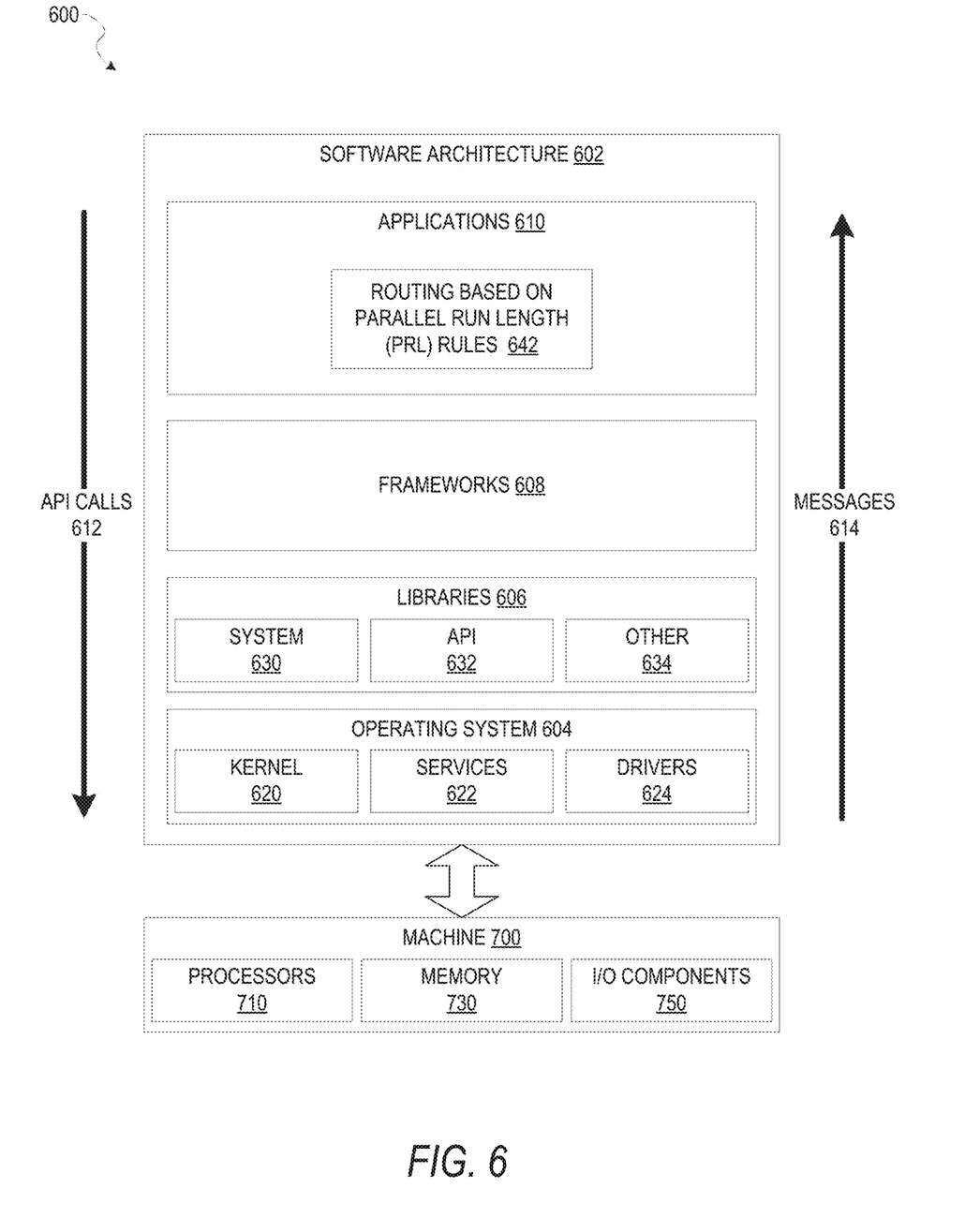
FIG. 6 is a block diagram illustrating an example of a software architecture that may be operating on an electronic design automation (FDA) computing device and may be used with methods for routing a net of a circuit design with multiple layer ranges, according to some embodiments.

FIG. 6 is a block diagram 600 illustrating an example of a software architecture 602 that may be operating on an EDA computer and may be used with methods for circuit design routing (e.g., routing a network of a circuit design) based on parallel run length rules, according to some example embodiments. The software architecture 602 can be used as an EDA computing device to implement any of the methods described above. Aspects of the software architecture 602 may, in various embodiments, be used to store circuit designs, and to route a circuit design based on parallel run length rules in an EDA environment to generate circuit designs, from which physical devices may be generated.

FIG. 6 is merely a non-limiting example of a software architecture 602, and it will be appreciated that many other architectures can be implemented to facilitate the functionality described herein. In various embodiments, the software architecture 602 is implemented by hardware such as a machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, software frameworks 608, and applications 610. Operationally, the applications 610 invoke application programming interface (API) calls 612 through the software stack and receive messages 614 in response to the API calls 612, consistent with some embodiments. In various embodiments, any client device, any server computer of a server system, or any other device described herein may operate using elements of the software architecture 602. An EDA computing device described herein may additionally be implemented using aspects of the software architecture 602, with the software architecture 602 adapted for operating to perform routing a net of a circuit design in any manner described herein.

Figure 7:
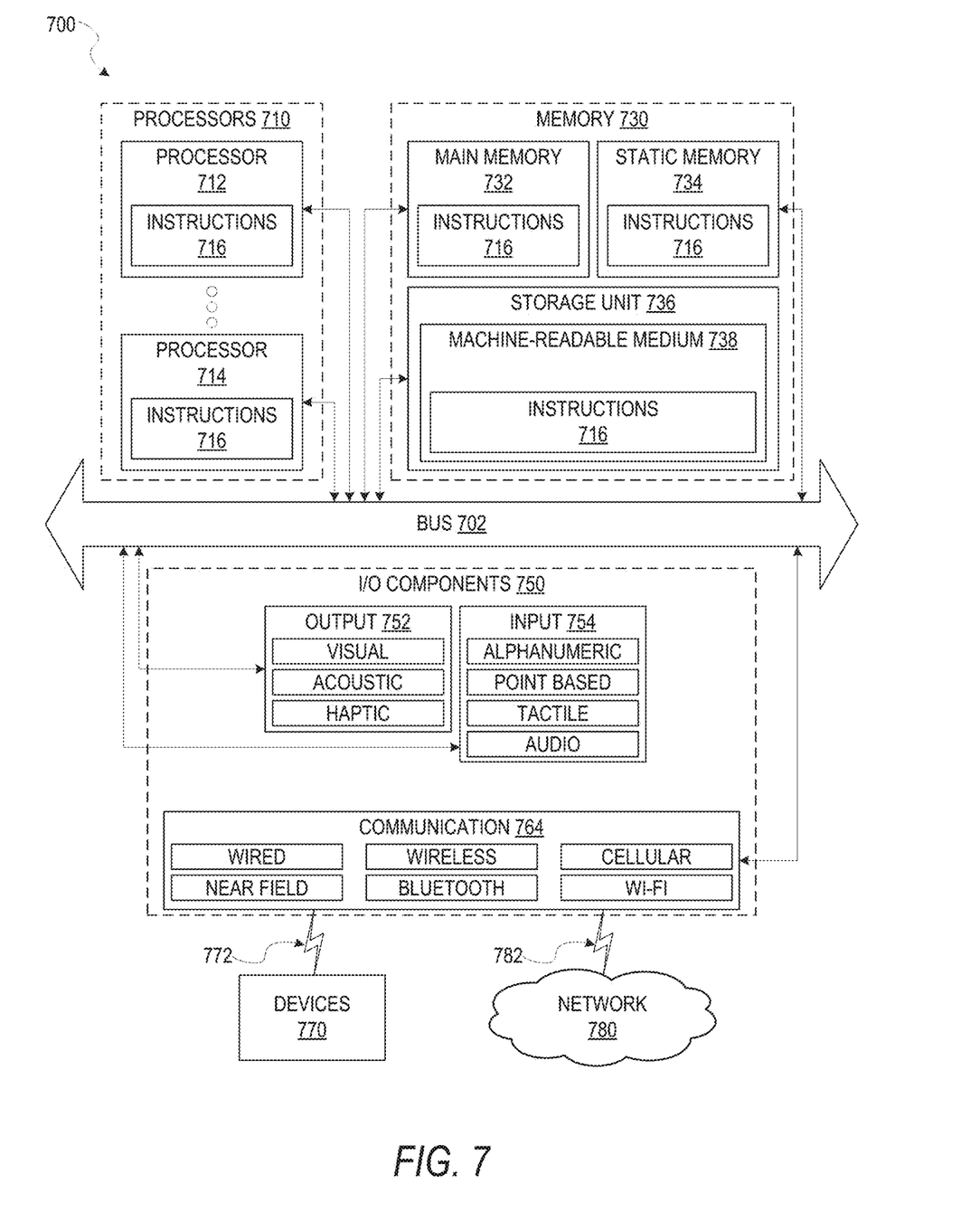
FIG. 7 is a diagram representing a machine in the form of a computer system within which a set of instructions are executed, causing the machine to perform any one or more of the methods discussed herein, according to some example embodiments.

In one embodiment, an EDA application of the applications 610 performs circuit design routing based on parallel run length rules according to embodiments described herein using various modules within the software architecture 602. For example, in one embodiment, an EDA computing device similar to the machine 700 includes the memory 730 and the one or more processors 710. The processors 710 also implement a routing based on parallel run length (PRL) rules module 642 for routing a network of a circuit design (net routing) based on parallel run length rules in accordance with various embodiments described herein.

In various other embodiments, rather than being implemented as modules of the one or more applications 610, the routing based on parallel run length rules module 642 may be implemented using elements of the libraries 606, the operating system 604, or the software frameworks 608.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 such as libraries of blocks for use in an EDA environment or other libraries that can provide functions such as memory allocation functions, string manipulation functions, mathematic functions, and the like. In addition, the libraries 606 can include API libraries 632 such as media libraries (e.g., libraries to support presentation and manipulation of various media formats such as Joint Photographic Experts Group (JPEG or PG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 may also include other libraries 634.

The software frameworks 608 provide a high-level common infrastructure that can be utilized by the applications 610, according to some embodiments. For example, the software frameworks 608 provide various graphic user interface (GUI) functions, high-level resource management, high-level location services, and so forth. The software frameworks 608 can provide a broad spectrum of other APIs that can be utilized by the applications 610, some of which may be specific to a particular operating system 604 or platform. In various embodiments, the systems, methods, devices, and instructions described herein may use various files, macros, libraries, and other elements of an EDA design environment to implement circuit design routing based on parallel run length rules as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 602, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations, Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 700 including processors 710), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 700, but deployed across a number of machines 700. In some example embodiments, the processors 710 or processor-implemented modules are located in a single geographic location (e.g., within a home environment, an office environment, or a server farm). In other example embodiments, the processors or processor-implemented modules are distributed across a number of geographic locations, FIG. 7 is a diagrammatic representation of the machine 700 in the form of a computer system within which a set of instructions may be executed for causing the machine 700 to perform any one or more of the methodologies discussed herein, according to an example embodiment. FIG. 7 shows components of the machine 700, which is, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, or any machine capable of executing the instructions 716, sequentially or otherwise, that specify actions to be taken by the machine 700. Further, awhile only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute the instructions 716 contemporaneously. Although FIG. 7 shows multiple processors 710, the machine 700 may include a single processor 712 with a single core, a single processor 712 with multiple cores (e.g., a multi-core processor 712), multiple processors 710 with a single core, multiple processors 710 with multiple cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., the instructions 716) for execution by a machine (e.g., the machine 700), such that the instructions, when executed by one or more processors of the machine (e.g., the processors 710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, the communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine or any of a wide variety of peripheral devices (e.g., a peripheral device coupled via a USB).

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling.

Furthermore, the machine-readable medium 738 is non-transitory (in other words, not having any transitory signals) in that it does not embody a propagating signal. However, labeling the machine-readable medium 738 "non-transitory" should not be construed to mean that the machine-readable medium 738 is incapable of movement; the machine-readable medium 738 should be considered as being transportable from one physical location to another. Additionally, since the machine-readable medium 738 is tangible, the machine-readable medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
    accessing, by a hardware processor, routing blockage data associated with a circuit design, the routing blockage data describing a set of existing routing blockages within the circuit design;
    accessing, by the hardware processor, a plurality of parallel run length rules from parallel run length rule data associated with the circuit design;
    generating, based on the parallel run length rule data, a set of additional routing blockages associated with a particular routing blockage in the set of existing routing blockages, the set of additional routing blockages comprising:
        a first additional routing blockage that is positioned adjacent to a boundary of the particular routing blockage; and
        a second additional routing blockage that is positioned adjacent to a boundary of the first additional routing blockage;
    generating, based on the set of existing routing blockages and the set of additional routing blockages, a capacity map for the circuit design; and
    routing a network of the circuit design based on the capacity map.

2. The method of claim 1, wherein the routing the network of the circuit design based on the capacity map comprises performing global routing on the circuit design based on the capacity map.

3. The method of claim 2, further comprising performing detailed routing on the circuit design after the performing the global routing on the circuit design.

4. The method of claim 1, further comprising performing layer assignment on the circuit design after the routing the network of the circuit design based on the capacity map.

5. The method of claim 1, further comprising performing track assignment on the circuit design after the routing the network of the circuit design based on the capacity map.

6. The method of claim 1, wherein the parallel run length rule data comprises a table describing the plurality of parallel run length rules.

7. The method of claim 1, wherein a third additional routing blockage, in the set of additional routing blockages, is positioned adjacent to a boundary of the first additional routing blockage and is positioned relative to the second additional routing blockage such that routing is permitted within a space between the first and second additional routing blockages.

8. The method of claim 1, wherein a plurality of additional routing blockages, in the set of additional routing blockages, is positioned adjacent to a perimeter of the particular routing blockage.

9. The method of claim 1, wherein a parallel run length rule, in the plurality of parallel run length rules, describes a spacing between two parallel wires.

10. A device comprising:
a memory storing instructions; and
a hardware processor communicatively coupled to the memory and configured by the instructions to perform operations comprising:
accessing routing blockage data associated with a circuit design, the routing blockage data describing a set of existing routing blockages within the circuit design;
accessing a plurality of parallel run length rules from parallel run length rule data associated with the circuit design;
generating, based on the parallel run length rule data, a set of additional routing blockages associated with a particular routing blockage in the set of existing routing blockages, the set of additional routing blockages comprising:
a first additional routing blockage that is positioned adjacent to a boundary of the particular routing blockage; and
a second additional routing blockage that is positioned adjacent to a boundary of the first additional routing blockage;
generating, based on the set of existing routing blockages and the set of additional routing blockages, a capacity map for the circuit design; and
performing global routing on the circuit design, the global routing comprising routing a network of the circuit design based on the capacity map.

11. The device of claim 10, wherein the operations further comprise:
performing detailed routing on the circuit design after the performing global routing on the circuit design.

12. The device of claim 10, wherein the global routing further comprises:
performing layer assignment on the circuit design after the routing the network of the circuit design based on the capacity map.

13. The device of claim 10, wherein the global routing further comprises:
performing track assignment on the circuit design after the routing the network of the circuit design based on the capacity map.

14. The device of claim 10, wherein the parallel run length rule data comprises a table describing the plurality of parallel run length rules.

15. The device of claim 10, wherein a third additional routing blockage, in the set of additional routing blockages, is positioned adjacent to a boundary of the first additional routing blockage and is positioned relative to the second additional routing blockage such that routing is permitted within a space between the first and second additional routing blockages.

16. The device of claim 10, wherein a plurality of additional routing blockages, in the set of additional routing blockages, is positioned adjacent to a perimeter of the particular routing blockage.

17. The device of claim 10, wherein a parallel run length rule, in the plurality of parallel run length rules, describes a spacing between two parallel wires.

18. A non-transitory computer-readable medium comprising instructions that, when executed by a hardware processor of a device, cause the device to perform operations comprising:
accessing a plurality of parallel run length rules from parallel run length rule data associated with the circuit design;
generating, based on the parallel run length rule data, a set of additional routing blockages associated with a particular routing blockage in a set of existing routing blockages within the circuit design;
generating, based on the set of existing routing blockages and the set of additional routing blockages, a capacity map for the circuit design, the set of additional routing blockages comprising:
a first additional routing blockage that is positioned adjacent to a boundary of the particular routing blockage; and
a second additional routing blockage that is positioned adjacent to a boundary of the first additional routing blockage; and
routing a network of the circuit design based on the capacity map.

19. The non-transitory computer-readable medium of claim 18, wherein a third additional routing blockage, in the set of additional routing blockages, is positioned adjacent to a boundary of the first additional routing blockage and is positioned relative to the second additional routing blockage such that routing is permitted within a space between the first and second additional routing blockages.

20. The non-transitory computer-readable medium of claim 18, wherein a plurality of additional routing blockages, in the set of additional routing blockages, is positioned adjacent to a perimeter of the particular routing blockage.

* * * * *